March 7, 1933. W. MESSERSCHMITT 1,900,067
SPAR FOR AIRPLANES
Filed Sept. 21, 1929
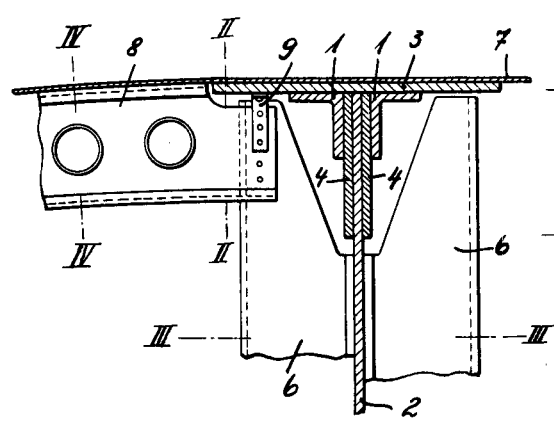
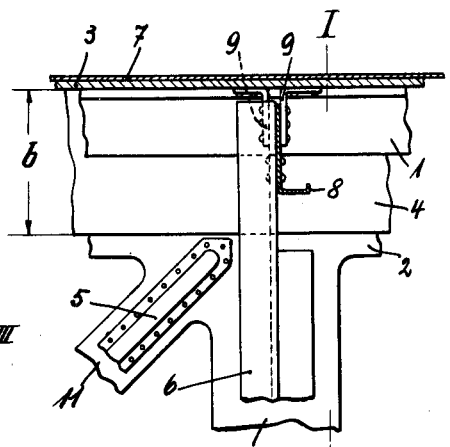
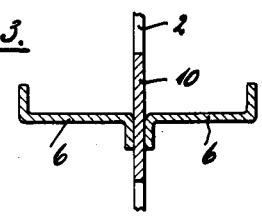
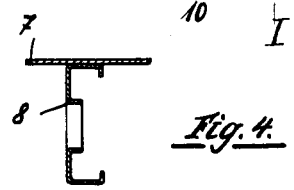
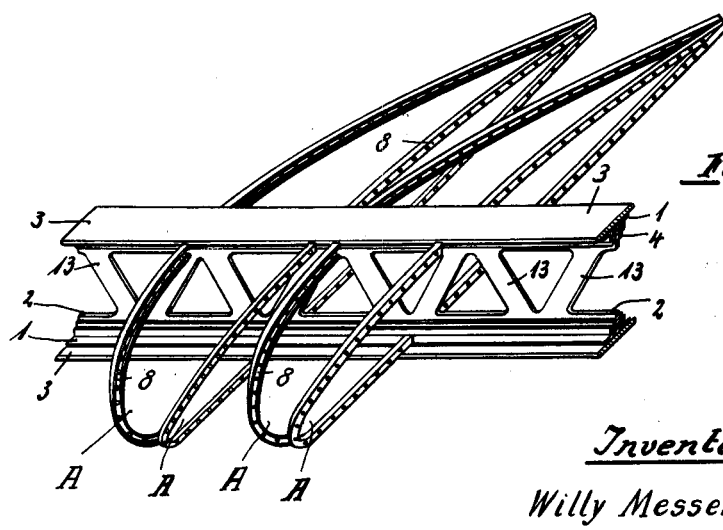
Inventor:
Willy Messerschmitt
by Kteinhäuz
Atty.

Patented Mar. 7, 1933

1,900,067

UNITED STATES PATENT OFFICE

WILLY MESSERSCHMITT, OF AUGSBURG, GERMANY

SPAR FOR AIRPLANES

Application filed September 21, 1929, Serial No. 394,202, and in Germany September 25, 1928.

My invention relates to spars for airplanes, for instance wing spars.

It is an object of my invention to provide a spar which is simpler and stronger than the spars as designed heretofore and more readily made. To this end I design the principal part of the spar as a single plate, instead of the usual construction in which spars are built up from sections in the manner of a lattice girder. The parts which are connected with the single plate spar are secured thereto exclusively by open sections, and the sections are so arranged that they are safe against buckling under compression.

In airplane construction it is necessary that the material should be stressed to the limit as low weight is a primary consideration. This condition is fulfilled without difficulty in parts under tensile stress, but not so readily in parts under compression. In parts under tensile stress plain rectangular sections or open sections, that is, angle sections, channel sections and the like, can be used, but in parts under compression tubular and other closed sections have been provided, as open sections are not safe against buckling under compression. Closed sections, however, involve the drawback that riveting is often difficult, and that in many cases the rivets are not accessible after the parts have been finished so that maintenance and repair are greatly interfered with and often impracticable. Protection against corrosion on the inside of closed sections is another problem.

According to my invention open sections may be used instead of closed sections and thereby the drawbacks of the closed sections are eliminated while conserving their strength, as the open sections are so arranged and connected that they will withstand compression pressures like closed sections. The open sections are accessible without difficulty and readily repaired and maintained.

In the drawing affixed to this specification and forming part thereof, a single-plate spar and a built-up spar embodying my invention are illustrated diagrammatically by way of example.

In the drawing
Fig. 1 is a section showing the upper part of a single-plate spar in section on the line 1—1 in Fig. 2,
Fig. 2 is an elevation of the spar, viewed from the left in Fig. 1 and partly in section on the line 2—2 in Fig. 1,
Fig. 3 is a section on the line 3—3 in Fig. 1,
Fig. 4 is a section on the line 4—4 in Fig. 1,
Fig. 5 is a perspective illustration of a single-plate spar having exclusively diagonal struts in combination with four wing ribs.

Referring to the drawing, and first to Figs. 1 and 2, 2 is a single plate constituting the spar which, as shown in Fig. 2, has vertical struts 10 and diagonal struts 11.

4, 4 are reinforcing straps which extend along the upper edge of the plate 2 and may also extend along its lower edge. 1, 1 are angle-sections which are riveted to the straps 4, 4 on their outsides, 3 is a chord which is placed on the upper flanges of the sections 1, 1, 6, 6 are channel sections for reinforcing the vertical struts 10, and 5 are semi-cylindrical sections which are riveted to either side of the diagonal struts 11. 8 is a strip which here is shown of channel section, Fig. 4, perforated for reducing its weight, and secured to the upper end of one of the sections 6. The flange of the section is cut away for the chord 3 as shown in Fig. 2. 9, 9 are angle brackets which are riveted to the web of the section 8, the upper flange of the section being cut away at this point, and to the chord 3. 7 is a fairing which is placed on top of the strip 8 and the chord 3 and extends along the ribs A, Fig. 5.

It will appear that the spar is built up so that buckling is prevented throughout the structure. The vertical struts 10 and the diagonals 11 are so wide as to prevent buckling in the plane of the plate 2, and are braced against buckling at right angles to the plane by the Z-sections 6 and the semi-cylindrical sections 5. Bending of the spar itself in transverse direction is prevented by the sections 1, 1, the chord 3 and by the fairing 7, which, as mentioned, is of metal, and buckling of the angle sections 1, 1 is prevented in turn by their flanges being secured to the chord 3 and the straps 4, 4, respectively.

The depth $b$ of the flanges above and below the cut-out portions of the spar, and the pitch of the vertical struts 10, are calculated so that the chords of the spar, that is, the parts 1, 3 and 4, are stressed practically to the limit of their compression strength, and in case of failure the material will not be buckled but upset. The sections 1, the chord 3, and the straps 4 are so strong and compact that the core of the combined section may be considered as equivalent to the solid material.

The forces in the spar and in the chords 3 decrease toward the rear end of the wing section, and by my construction I am enabled to adapt the sections to the forces. For instance, the following variables may be selected in conformity with the forces. The section and the width of the angles 1 at either side of the spar 2; that is, one of the angles may be of smaller section or smaller size than the other; the width $b$ or the flanges; the pitch of the vertical struts; the thickness of the spar 2, the size of the straps 4; the pitch of the ribs A. Preferably the joints of the several parts of the structure are staggered.

It will be understood that by combining the several variables, the combined section may be adapted to any conditions, and the material may be utilized to best advantage.

Referring now to the Fig. 5, this shows a single-plate spar 2 in which instead of vertical and diagonal struts 10, 11, only diagonal struts 13 are provided. If desired the struts may be reinforced with sections 5 as shown in Fig. 2.

The ribs A illustrated in Fig. 5 are placed in V-position. At the bottom the ribs are contracted into a keel which is connected with the lower chord 3 of the spar 2.

Other sections than the angle sections 1, 1, or the Z-sections 6 and the channels 8 may be provided, and in general I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A structure for aircraft, comprising a single spar having a single web, reinforcing means therefor composed of angle members extending longitudinally of its edges, vertical and horizontal sheet metal strips also extending therealong, and a non-buckling cover plate for said structure to which said spar is connected by said angle members.

2. A structure for aircraft as claimed in claim 1, in which the non-buckling cover plate is disposed at the leading edge of the structure.

3. A structure for aircraft as claimed in claim 1, in which the sections of the spar are composed of cut-out or open-work members.

4. A structure for aircraft comprising a single spar having a single web, reinforcing means therefor composed of angle members extending longitudinally of its edges, vertical and horizontal sheet metal strips also extending therealong, vertically disposed flanged bracing members secured to the web of the spar, angle brackets connecting the bracing members to the horizontal strips, ribs connected to said bracing members, and a non-buckling cover plate connected to said strips and ribs.

5. A wing structure for aircraft comprising a single spar having a single web, reinforcing members at its edges, a non-buckling cover plate for said structure to which the reinforcing members are connected, bracing members on said web, and ribs attached at their ends to said bracing members and at their edges to said cover plate.

In testimony whereof I affix my signature.

WILLY MESSERSCHMITT.